(12) United States Patent
Kawai et al.

(10) Patent No.: US 10,610,947 B2
(45) Date of Patent: Apr. 7, 2020

(54) POWER SUPPLY SYSTEM AND POWER SUPPLY DEVICE

(71) Applicant: DAIHEN Corporation, Osaka-shi, Osaka (JP)

(72) Inventors: Hirokazu Kawai, Osaka (JP); Songjie Hou, Osaka (JP); Hideo Shiozaki, Osaka (JP); Haruhiko Manabe, Osaka (JP); Satoru Hata, Osaka (JP); Hiroyasu Mondori, Osaka (JP); Futoshi Nishisaka, Osaka (JP); Takanori Onishi, Osaka (JP)

(73) Assignee: DAIHEN Corporation, Osaka-shi, Osaka (JP)

( * ) Notice: Subject to any disclaimer, the term of this patent is extended or adjusted under 35 U.S.C. 154(b) by 72 days.

(21) Appl. No.: 16/074,054

(22) PCT Filed: Dec. 29, 2016

(86) PCT No.: PCT/JP2016/089214
§ 371 (c)(1),
(2) Date: Jul. 30, 2018

(87) PCT Pub. No.: WO2017/134971
PCT Pub. Date: Aug. 10, 2017

(65) Prior Publication Data
US 2019/0039163 A1    Feb. 7, 2019

(30) Foreign Application Priority Data

Feb. 3, 2016    (JP) .................. 2016-019269
Jun. 21, 2016    (JP) .................. 2016-122884
Oct. 14, 2016    (JP) .................. 2016-202739

(51) Int. Cl.
G06F 19/00    (2018.01)
B23K 9/10    (2006.01)
(Continued)

(52) U.S. Cl.
CPC .......... B23K 9/1062 (2013.01); B23K 9/0953 (2013.01); B23K 9/1012 (2013.01);
(Continued)

(58) Field of Classification Search
CPC ............. H02M 3/28; H02M 7/12; H02M 7/23
(Continued)

(56) References Cited

U.S. PATENT DOCUMENTS 6,291,798 B1    9/2001    Stava
2008/0120048 A1    5/2008    Zhou
(Continued)

FOREIGN PATENT DOCUMENTS

CN    102480244 A    5/2012
JP    2001129667    5/2001
(Continued)

OTHER PUBLICATIONS

English translation of International Search Report of PCT/JP2016/089214, dated Jan. 23, 2017.
(Continued)

*Primary Examiner* — Md Azad
(74) *Attorney, Agent, or Firm* — Bret E. Field; Bozicevic, Field & Francis LLP

(57) ABSTRACT

A power supply system includes multiple power supply devices connected in common to a load. A first power supply device calculates control information for controlling voltage or current to be output to the load and controls the output to the load based on the calculated control information while transmitting the control information to a second power supply device. The second power supply device receives the control information transmitted from the first power supply device and control the output to the load based on the received control information while detecting current to be output from its own device to the load and transmitting
(Continued)

current information to the first power supply device. The first power supply device receives the current information transmitted from the second power supply device and calculate control information based on the received current information and the current and voltage detected by its own device.

13 Claims, 11 Drawing Sheets

(51) Int. Cl.
  *B23K 9/12*     (2006.01)
  *B23K 9/173*    (2006.01)
  *H02M 7/23*    (2006.01)
  *H02M 3/28*    (2006.01)
  *B23K 9/133*    (2006.01)
  *H02M 7/12*    (2006.01)
  *B23K 9/095*    (2006.01)
  *G05B 19/042*   (2006.01)
  *H02M 1/00*    (2006.01)

(52) U.S. Cl.
  CPC ............ *B23K 9/1075* (2013.01); *B23K 9/124* (2013.01); *B23K 9/133* (2013.01); *B23K 9/173* (2013.01); *G05B 19/042* (2013.01); *H02M 3/28* (2013.01); *H02M 7/12* (2013.01); *H02M 7/23* (2013.01); *G05B 2219/2639* (2013.01); *G05B 2219/45135* (2013.01); *H02M 2001/007* (2013.01); *H02M 2001/0009* (2013.01)

(58) Field of Classification Search
  USPC .......................................................... 700/212
  See application file for complete search history.

(56) References Cited

U.S. PATENT DOCUMENTS

| 2013/0141952 | A1* | 6/2013 | Kaneko | .................. | H02M 7/493 363/72 |
| 2014/0340947 | A1* | 11/2014 | Emoto | .................. | H02M 3/285 363/26 |
| 2014/0346882 | A1* | 11/2014 | Emoto | ...................... | H02J 1/04 307/65 |
| 2017/0093209 | A1* | 3/2017 | Banno | ..................... | H02J 9/061 |
| 2017/0220085 | A1* | 8/2017 | Guo | ..................... | G05B 19/048 |

FOREIGN PATENT DOCUMENTS

| JP | 2003304679 | 10/2003 |
| JP | 2006116556 | 5/2006 |
| JP | 2007020305 | 1/2007 |
| JP | 2009296876 | 12/2009 |
| JP | 2013038864 | 2/2013 |
| JP | 2015027143 | 2/2015 |
| JP | 2015198458 | 11/2015 |

OTHER PUBLICATIONS

First Office Action for Chinese Application No. 201680079748.2 dated Dec. 27, 2019, with its English translation, 16 pages.

* cited by examiner

POWER SUPPLY SYSTEM AND POWER SUPPLY DEVICE

CROSS-REFERENCE TO RELATED APPLICATIONS

This application is the national phase under 35 U. S. C. § 371 of PCT International Application No. PCT/JP2016/089214 which has an International filing date of Dec. 29, 2016 and designated the United States of America.

FIELD

The present invention relates to a power supply system including multiple power supply devices that are parallel-connected to a common load, and a power supply device constituting the power supply system.

BACKGROUND

There are devices that require large current over 500-1000 amperes such as are welding device, an arc cutting device or the like. Japanese Patent Application Laid-Open No. 2001-129667 discloses a power supply device that includes multiple switching converter circuits for performing AC (alternating current)/DC (direct current) conversion on commercial alternating current and that is capable of outputting large current to an arc welding device.

The operation of the switching converter circuits is controlled by a single controller, which enables formation of a single power supply device as a whole. The controller detects current output and collected from each of the switching converters and performs PWM control on each of the switching converter circuits such that the detected current matches target current.

SUMMARY

The power supply device which is thus configured to output large current by a single device presents various problems such as a heat resistant design to be resistant to long hours of operation, a safety design and so on, and is generally expensive.

Meanwhile, connecting existing multiple power supply devices parallel-connected to a common load, and supplying current from each of the power supply devices to the load has also been conceived. However, each of the power supply devices basically independently operates and is controlled such that the output current matches target current. This causes unstable current supply from each of the power supply devices to the load.

For example, a welding load often varies from a short circuit load through an arc load to no load for a short time period, which causes continuous transient state of current.

Monitoring current or the like output from each of the parallel-connected power supply devices to the load by utilizing an external control device and correcting the operation of each of the power supply devices are also conceivable. This arises a problem of the cost of equipment required for introducing the external control device. In addition, each of the power supply devices continues to operate independently, which arises a problem of lack of stability of current output to the load.

It is an object to provide a power supply system including multiple power supply devices parallel-connected to a common load and capable of stably controlling the current output from each of the power supply devices to the load without introducing an external control device, and a power supply device constituting the power supply system.

A power supply system according to the present disclosure is a power supply system comprising a plurality of power supply devices including a first power supply device and a second power supply device, the plurality of power supply devices being parallel-connected to a common load. The first power supply device comprises a control information calculation unit that calculates control information for controlling voltage or current to be output to the load, a control unit that controls voltage or current to be output to the load based on the control information calculated by the control information calculation unit, and a control information transmission unit that transmits the control information calculated by the control information calculation unit to the second power supply device. The second power supply device comprises a control information reception unit that receives the control information transmitted from the first power supply device, a control unit that controls voltage or current to be output to the load based on the control information received by the control information reception unit, a current detection unit that detects current output from the second power supply device to the load, and a current information transmission unit that transmits current information indicative of the current detected by the current detection unit to the first power supply device. The first power supply device further comprises a current information reception unit that receives the current information transmitted from the second power supply device, a current detection unit that detects current output from the first power supply device to the load, and a voltage detection unit that detects voltage output from the first power supply device to the load, and the control information calculation unit calculates control information for controlling voltage or current to be output to the load based on the current indicated by the current information received by the current information reception unit, the current detected by the current detection unit and the voltage detected by the voltage detection unit that are included in the first power supply device.

According to the present disclosure, the first power supply device and the second power supply device that are connected to a common load mutually perform communication with each other, and the first power supply device controls the output from the overall power supply system. Accordingly, current to be output from each of the power supply devices to the load can be stably controlled.

More specifically, the first power supply device calculates control information for controlling the output to the load. The first power supply device then controls the output from its own device based on the control information obtained by calculation and transmits the control information to the second power supply device.

The second power supply device receives the control information transmitted from the first power supply device without performing calculation of the control information for controlling the output and controls the output from its own device based on the control information calculated by the first power supply device. The second power supply device then detects the current output from its own device to the load and transmits the current information to the first power supply device.

The first power supply device receives the current information transmitted from the second power supply device and calculates control information based on the current indicated by the received current information and the current and voltage detected by its own device. The control information calculated here is information calculated based on the current and voltage output from the first power supply device and the second power supply device and capable of controlling the output from the overall power supply system. The first power supply device and the second power supply device control the output based on such control information, which does not make current output from each of the power supply devices to the load unstable and enables stable control on the output.

In the power supply system according to the present disclosure, each of the first power supply device and the second power supply device includes a display unit for indicating an operating state of each of the devices. The display unit of the first power supply device displays, if the first power supply device is operating, current obtained by summing up the current detected by the first power supply device and the current indicated by the current information received by the current information reception unit and the voltage detected by the voltage detection unit, and the display unit of the second power supply device displays, if the second power supply device is operating, predetermined information.

According to the present disclosure, on the display unit of the first power supply device performing control on the overall power supply system, the current and voltage that are being output from the power supply system to the load are displayed, and on the display unit of the second power supply device, predetermined information is displayed.

Accordingly, the user can confirm the information about the current and voltage that are being output from the power supply system to the load by using the display unit of the first power supply device. Furthermore, the predetermined information is displayed on the display unit of the second power supply device, which eliminates unnecessary confusion for the user. For example, in the case where numerical values are displayed on both of the display units of the first power supply device and the second power supply device, the user intends to confirm the meaning of the numerical values displayed on the display units and the relationship between the values, which may provide unnecessary work load for confirmation. According to the present application, the voltage and the current are displayed on only the display unit of the first power supply device, which avoids imposing such unnecessary work load for confirmation on the user.

In the power supply system according to the present disclosure, the control unit of the first power supply device stops operation of the first power supply device if the current information reception unit receives no current information.

According to the present disclosure, in the case where the first power supply device does not receive the current information to be transmitted from the second power supply device, the first power supply device stops operation of its own device regarding that abnormality occurs to the communication between the first power supply device and the second power supply device. When the operation of the first power supply device is stopped, the operation of the second power supply device is also stopped. Accordingly, if abnormality occurs to the communication between the power supply devices, the overall power supply system is stopped to thereby ensure safety. Additionally, the power supply system can be protected.

In the power supply system according to the present disclosure, the first power supply device further comprises a determination unit that determines whether or not the current indicated by the current information received by the current information reception unit is less than a threshold, and stops operation of the first power supply device if the determination unit determines that the current is less than the threshold.

According to the present disclosure, in the case where the current output from the second power supply device is less than the threshold though the first power supply device outputs current from its own device, the first power supply device stops operation of its own device, regarding that abnormality occurs to the second power supply device. When the operation of the first power supply device is stopped, the operation of the second power supply device is also stopped. Accordingly, in the case where abnormality occurs to the output from the second power supply device, the overall power supply system can be stopped to thereby ensure safety. Furthermore, the power supply system can be protected.

It is noted that the threshold is a value for determining whether or not current is output from the second power supply device.

In the power supply system according to the present disclosure, the second power supply device comprises an abnormality information transmission unit that transmits abnormality information indicative of the presence or absence of abnormality for the second power supply device to the first power supply device, and the first power supply device comprises an abnormality information reception unit that receives the abnormality information transmitted from the second power supply device, and the control unit of the first power supply device stops operation of the first power supply device depending on the abnormality information received by the abnormality information reception unit.

According to the present disclosure, the first power supply device receives abnormality information indicative of the presence or absence of abnormality for the second power supply device and stops operation of its own device depending on the operating state of the second power supply device. When the operation of the first power supply device is stopped, the operation of the second power supply device is also stopped. Accordingly, in the case where any abnormality occurs to the second power supply device, the overall power supply system can be stopped. For example, in the case where overcurrent occurs to the second power supply device, the overall power supply system can be stopped, which can ensure safety. Furthermore, the power supply system can be protected.

In the power supply system according to the present disclosure, the plurality of power supply devices supply power to a load concerning arc welding.

According to the present disclosure, the power supply system can supply large current to the load concerning arc welding.

In the power supply system according to the present disclosure, each of the power supply devices further comprises an inverter that is for controlling voltage or current to be output to the load, the control unit controls voltage or current to be output to the load by outputting a pulse signal to the inverter, and the control information transmission unit transmits the control information during an off time period of the pulse signal output by the control unit.

According to the present disclosure, the control unit of each of the power supply devices controls the voltage or current to be output to the load by outputting a pulse signal to the inverter. The pulse signal is a PWM signal, for example. Meanwhile, according to the power supply system of the present disclosure, multiple power supply devices are configured to transmit and receive to and from each other control information concerning control on power supply, which requires high-speed communication. Thus, communication may be made low resistant to noise due to difficulty in performing complex processing for improving the reliability of the communication.

Hereupon, the control information transmission unit of the first power supply device transmits control information to the second power supply device during the off-time period of the pulse signal. The control information is transmitted and received during the off-time period of the pulse signal to thereby prevent noise caused by the operation of the inverter from riding on the control information and enable improvement in communication stability between the power supply devices. It is noted that synchronization between control on the inverter by the control unit and transmission of information by the control information transmission unit is a precondition.

In the power supply system according to the present disclosure, the current information transmission unit transmits current information during the off time period of the pulse signal output by the control unit.

According to the present disclosure, the current information transmission unit of the second power supply device transmits current information to the second power supply device during the off-time period of the pulse signal. Thus, it is possible to prevent noise caused by the operation of the inverter from being superposed on the current information and improve communication stability between the power supply devices.

In the power supply system according to the present disclosure, the first power supply device and the second power supply device transmit and receive information to and from each other by packet communication method if they output no voltage or no current to the load, and transmit and receive information to and from each other by non-packet communication method for transmitting and receiving a predetermined amount of data if they output voltage or current to the load.

According to the present disclosure, information is transmitted and received by non-packet communication method during welding operation requiring high-speed communication. Meanwhile, information is transmitted and received by packet communication method during non-welding operation not requiring high-speed communication. Hereafter, the communication mode performed during welding operation is called a "direct communication mode" while the communication mode performed during non-welding operation is called a "command communication mode."

In the direct communication mode during welding operation, for example, each of the power supply devices transmits and receives to and from each other control information for controlling the voltage or current to be output to the load as a predetermined amount of data by non-packet communication method. The predetermined amount of data is data of constant bit array, 32 bit data, for example. The information transmitted and received during the direct communication mode falls within the range of the predetermined amount of data. In the direct communication mode, the data amount to be dealt is small while data to be transmitted and received falls within the constant bit array, which enables high speed communication and can provide robustness against the loss of data.

In contrast, during non-welding operation, for example, during inching operation of the welding wire, each of the power supply devices transmits and receives information concerning feeding of a welding wire by packet communication method. In the command communication mode during non-welding operation, each of the power supply devices can transmit and receive various types of information. The power supply device can discriminate the data in the command communication mode from the data in the direct communication mode with reference to the header information of a packet.

In the power supply system according to the present disclosure, the second power supply device transmits and receives information by non-packet communication method and switches a communication mode to a packet communication method if the second power supply device does not receive the control information for a predetermined time period or longer.

In the case where the first power supply device and the second power supply device perform packet communication, that is, they are in the command communication mode, the reliability of the communication is high, and the first power supply device and the second power supply device can be switched to the direct communication mode being non-packet communication method without problem at the start of welding.

Meanwhile, in the case where the first power supply device and the second power supply device perform non-packet communication, that is, they are in the direct communication mode, they fails in communication at the end of welding, and the communication mode of the second power supply device may remain to perform non-packet communication though the communication mode of the first power supply device is switched to packet communication method. However, the second power supply device according to the present disclosure receives, in the case where it receives no control information for controlling voltage or current to be output to the load for a predetermined time period or longer, that is, it is in the non-welding operation, actively switches the communication mode to the command communication mode. The case where no control information is received includes a situation where information concerning packet communication is being received, a situation where control information indicative of zero output is being received and the like. Thus, the first power supply device and the second power supply device can surely switch the communication mode to the command communication mode at the end of welding.

The power supply device according to the present disclosure outputting voltage and current to a load comprises a current detection unit that detects current output to the load; a voltage detection unit that detects voltage output to the load; a current information reception unit that receives current information indicative of current output from a different power supply device to the load; a control information calculation unit that calculates control information for controlling voltage or current to be output to the load based on the current indicated by the current information received by the current information reception unit, the current detected by the current detection unit and the voltage detected by the voltage detection unit; a control unit that controls voltage or current to be output to the load based on the control information calculated by the control information calculation unit; and a control information transmission unit that transmits the control information calculated by the control information calculation unit to the different power supply device.

According to the present disclosure, the power supply device can constitute the above-mentioned power supply system and stably control the current output from its own power supply device and a different power supply device to the load.

The power supply device according to the present disclosure further comprises a current information transmission unit that transmits current information indicative of the current detected by the current detection unit to the different power supply device; a control information reception unit that receives control information transmitted from the different power supply device; and an operation unit that selects between a first control mode based on the control information calculated by the control information calculation unit and a second control mode based on the control information received by the control information reception unit. The control unit controls voltage or current to be output to the load based on the control information calculated by the control information calculation unit if the first control mode is selected, and controls voltage or current to be output to the load based on the control information received by the control information reception unit if the second control mode is selected.

According to the present disclosure, it is possible to select whether its own device functions as the first power supply device or the second power supply device as described above by operating the operation unit of the power supply device. Accordingly, multiple power supply devices according to the present application are prepared and connected in parallel, one power supply device can function as a first power supply device while another power supply device can function as a second power supply device, which enables formation of the power supply system described above.

An arbitrary power supply device can be switched to function as a first power supply device or a second power supply device. Thus, even if a power supply device functioning as a first power supply device fails, one of the power supply devices functioning as a second power supply device is switched so as to function as a first power supply device, which enables reconstruction of the power supply system.

In the power supply device according to the present disclosure, if no voltage or no current is output to the load, information is transmitted and received by packet communication method, while if voltage or current is output to the load, information is transmitted and received by non-packet communication method for transmitting and receiving a predetermined amount of data.

According to the present disclosure, during welding operation, the power supply device transmits and receives control information for controlling the voltage or current to be output to the load as a predetermined amount of data by non-packet communication method. In the direct communication mode during the welding operation, high speed communication is made possible, which provides robustness against the loss of data.

In contrast, during non-welding operation, the power supply device transmits and receives information concerning feeding of a welding wire by packet communication method. In the command communication mode during the non-welding operation, each of the power supply devices can transmit and receive various types of information.

In the power supply device according to the present disclosure, if no voltage or no current is output to the load, information is transmitted and received by packet communication method, while if voltage or current is output to the load, information is transmitted and received by non-packet communication method for transmitting and receiving a predetermined amount of data, and if information is transmitted and received by non-packet communication method and the control information is not received for a predetermined time period or longer, a communication mode is switched to the packet communication method.

According to the present disclosure, it is possible to surely switch the communication mode to the command communication mode at the end of welding.

The power supply device according to the present disclosure supply power to a load concerning arc welding.

According to the present disclosure, the power supply device can supply large current to the load concerning arc welding together with another power supply device.

Effect of Invention

According to the present disclosure, in the power supply system including multiple power supply devices parallel-connected to a common load, current to be output from each of the power supply devices to the load can be stably controlled without introducing an external control device.

The above and further objects and features will more fully be apparent from the following detailed description with accompanying drawings.

DETAILED DESCRIPTION

The present disclosure will be described below with reference to the drawings depicting embodiments.

Embodiment 1

Figure 1:
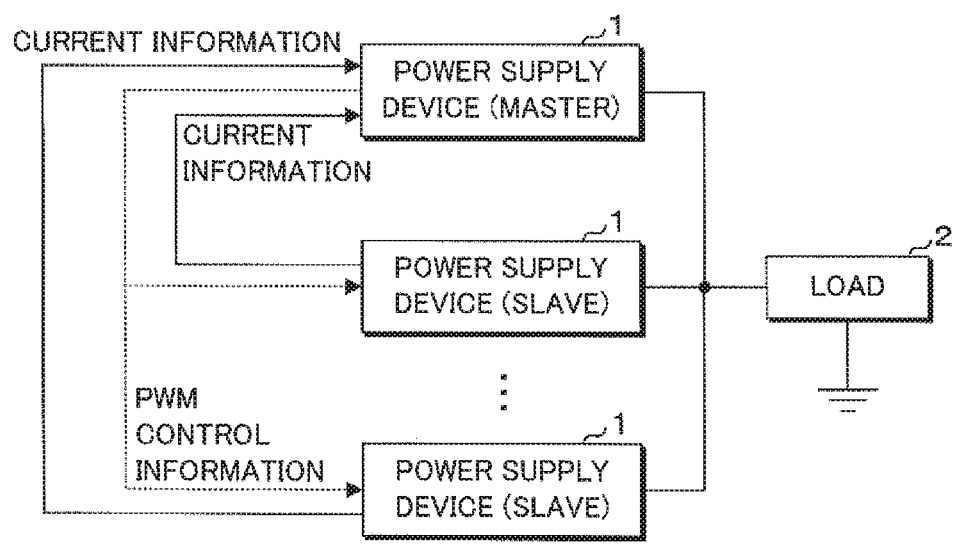
FIG. 1 is a block diagram illustrating one example of the configuration of a power supply system according to Embodiment 1.

FIG. 1 is a block diagram illustrating one example of the configuration of a power supply system according to Embodiment 1. The power supply system according to Embodiment 1 includes multiple power supply devices 1 that are parallel-connected to a common load 2 concerning arc welding and supply power to the load 2. The power supply devices 1 are connected to each other through a communication line. Each of the multiple power supply devices 1 is an isolated-typed switching power supply and performs AC/DC conversion to convert AC to required DC and supplies the DC which has been subject to the AC/DC conversion to the load 2.

One power supply device 1 of the multiple power supply devices 1 functions as a master power supply controlling the output from each of the power supply devices 1 by transmitting PWM control information to another power supply device 1 through a communication line. Another power supply device 1 functions as a slave power supply receiving the PWM control information transmitted from the one power supply device 1 and controls the output based on the received PWM control information. Hereafter, the power supply device 1 functioning as a master power supply is referred to as a first power supply device 1, and the power supply device 1 functioning as a slave power supply is referred to as a second power supply device 1, as necessary. The number of the second power supply devices 1 may be multiple or single.

The second power supply device 1 detects current to be output from its own device to the load 2 and transmits current information indicative of the detected current to the first power supply device 1 through the communication line. The first power supply device 1 receives the current information transmitted from the second power supply device 1 and sums up the current indicated by the current information and the current detected by its own device to thereby calculate the total current to be output from the power supply system to the load 2. The power supply system 1 then detects the voltage to be output to the load 2 from its own device and calculates PWM control information for controlling the output from each of the power supply devices 1 constituting the power supply system based on the voltage detected by the detection and the total current. The first power supply device 1 controls the output from its own device based on the PWM control information thus calculated and controls the operation of each of the power supply devices 1 by transmitting the PWM control information to the second power supply device 1 as described above.

Note that each of the power supply devices 1 can function as both of the master power supply and the slave power supply by switching the operation mode. Furthermore, by switching the operation mode, each of the power supply devices can also function as a single independent power supply device 1.

Figure 2:
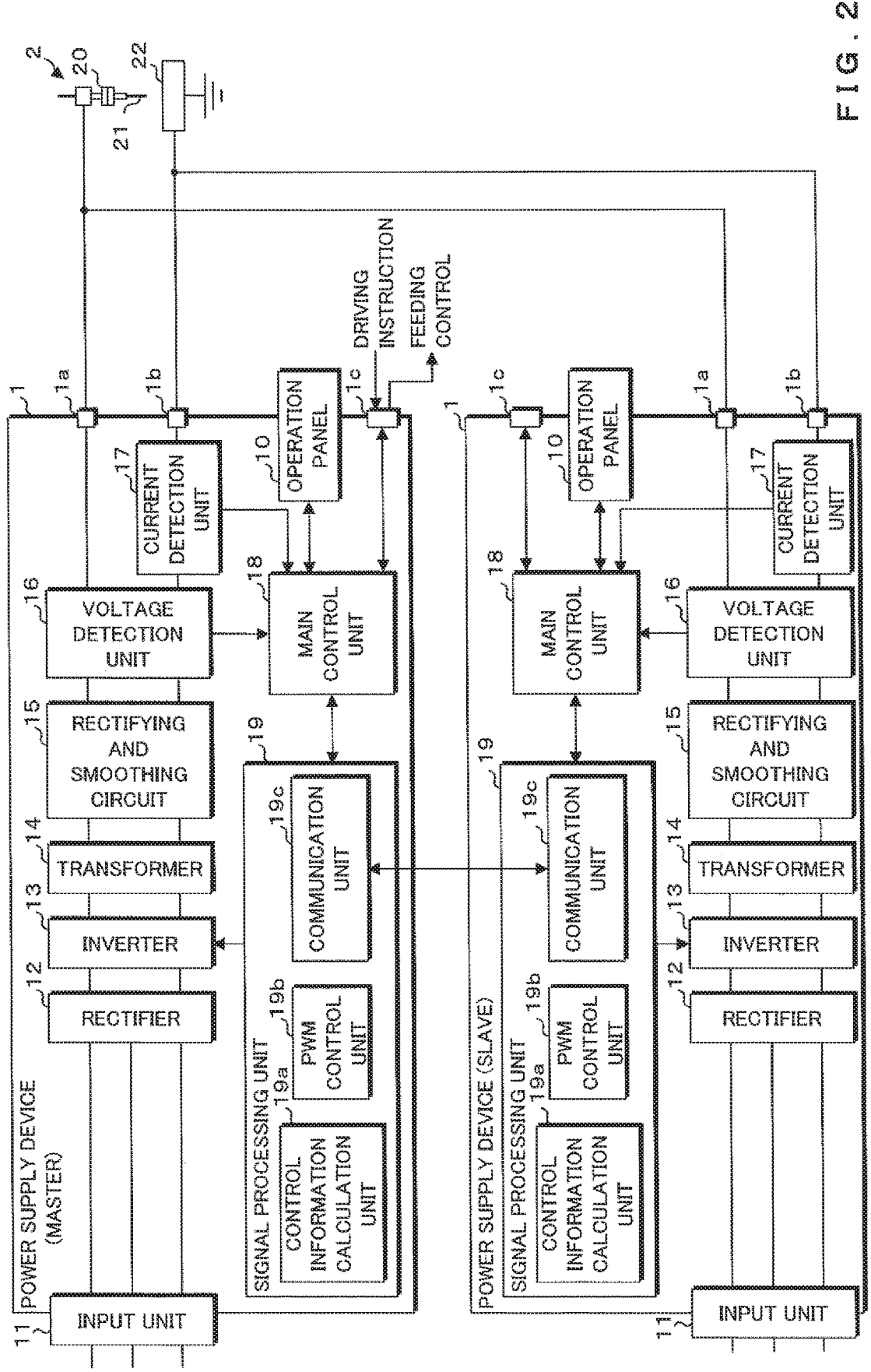
FIG. 2 is a block diagram illustrating one example of the configuration of power supply devices.

FIG. 2 is a block diagram illustrating one example of the configuration of the power supply device 1. Hereafter, description will be made assuming that the power supply system is formed by two power supply devices including the first power supply device 1 and the second power supply device 2 in the interest of simplicity. The first power supply device 1 and the second power supply device 1 are the same in configuration, and thus the configuration of one of the power supply device 1 will mainly be described.

The power supply device 1 is provided with an operation panel 10, an input unit 11, a rectifier 12, an inverter 13, a transformer 14, a rectifying and smoothing circuit 15, a voltage detection unit 16, a current detection unit 17, a main control unit 18 and a signal processing unit 19.

The input unit 11 is an input terminal connected to a three-phase alternating current power supply (not illustrated), for example. The input unit 11 is connected to the rectifier 12, and three-phase alternating current applied to the input terminal thereof is input to the rectifier 12.

The rectifier 12 is a diode bridge circuit, for example. The diode bridge has a circuit configuration having parallel-connected three series circuits each consisting of two forward-connected diodes. Across the output terminal of the diode bridge circuit, a smoothing capacitor (not illustrated) is provided. The rectifier 12 applies a full-wave rectification to the AC input from the three-phase alternating current power supply via the input unit 11 and outputs DC that has been smoothed by the smoothing capacitor to the inverter 13.

The inverter 13 is a circuit for converting the DC rectified and smoothed by the rectifier 12 to AC of high frequency and outputting the resultant to the transformer 14. The inverter 13 is a full bridge circuit consisting of four switching elements, for example. The full bridge circuit has a circuit configuration having two parallel-connected legs each consisting of two switching elements connected in series. Each switching element is a power device such as an insulated gate bipolar transistor (IGBT), a metal-oxide-semiconductor field effect transistor (MOSFET) or the like.

The transformer 14 transforms the AC output from the inverter 13 and outputs the transformed AC to the rectifying and smoothing circuit 15. The transformer 14 has a primary coil and a secondary coil each of which is wound around the core and that are magnetically connected to each other. The primary coil is connected to the inverter 13 while the secondary coil is connected to the rectifying and smoothing circuit 15.

The rectifying and smoothing circuit 15 is a circuit for rectifying and smoothing the AC output from the transformer 14, and the voltage and current of the rectified DC are respectively output from a positive output terminal 1a and a negative output terminal 1b to the load 2. The rectifying and smoothing circuit 15 is formed by, for example, a full-wave rectifying circuit using a center tap, a smoothing circuit using a reactor, or the like.

The load 2 is related to arc welding, for example, and includes a welding wire 21, a base metal 22, an arc being an ionized shield gas and so on. The positive output terminal 1a is electrically connected to the welding wire 21 through a positive power supply line and a welding torch 20 while the negative output terminal 1b is connected to the base metal 22 through a negative power supply line.

The voltage detection unit 16 is connected to the output side of the rectifying and smoothing circuit 15, for example, and is a circuit for detecting voltage to be output from its own device to the load 2 and outputting a voltage value signal indicative of the detected voltage value to the main control unit 18.

The current detection unit 17 is connected to the output side of the rectifying and smoothing circuit 15, for example, and is a circuit for detecting current to be output to the load 2 from its own device and outputting a current value signal indicative of the detected current value to the main control unit 18. The current detection unit 17 is, for example, a hall-typed current sensor with a magnetoelectric element such as a hall element or the like.

The main control unit 18 includes a central processing unit (CPU), a ROM, a RAM, an interface and so on and is a processor for controlling the overall operation of the power supply device 1. The main control unit 18 is connected to a control terminal 1c at its interface. The control terminal 1c of the power supply device 1 functioning as a master power supply is connected to a control communication line of the welding device to which a driving instruction signal output from the welding device is to be input. The main control unit 18 monitors the input state of a driving instruction signal, and outputs a driving request for operating the inverter 13 to the signal processing unit 19 if a driving instruction signal is input. Note that no driving instruction signal is input to the control terminal 1c of the power supply device 1 functioning as a slave power supply.

Furthermore, the main control unit 18 is connected, at its interface, to the voltage detection unit 16 and the current detection unit 17 from which a voltage value signal and a current value signal are input respectively. The main control unit 18 performs AD conversion on the input voltage value signal and current value signal and outputs voltage information and current information thus obtained through the AD conversion to the signal processing unit 19.

Moreover, the main control unit 18 is connected to the operation panel 10 and receives a signal depending on the operation performed on the operation panel 10. The main control unit 18 accepts the operation performed on the operation panel 10 by monitoring the signal. The main control unit 18 according to Embodiment 1 can accept selection of an operating mode of the power supply device 1 through the operation panel 10. The operation mode includes a master power supply mode (first control mode) that causes the power supply device 1 to function as a master power supply, a slave power supply mode that causes the power supply device 1 to function as a slave power supply (second control mode) and a single power supply mode that causes the power supply device 1 to function as a single power supply. Furthermore, the main control unit 18 causes the operation panel 10 to display an operating state of its own device by outputting to the operation panel 10 a display instruction signal for displaying various operating states such as an operating mode, output voltage, output current of its own device and the like.

In addition, the main control unit 18 of the power supply device 1 operating as a master power supply outputs from the control terminal 1c to the welding device a wire feeding control signal for controlling the feeding of the welding wire 21 in the welding device. It is noted that the power supply device 1 operating as a slave power supply does not output a wire feeding control signal.

The signal processing unit 19 is a digital signal processor (DSP) for outputting a PWM signal to switching elements constituting the inverter 13 and performing PWM control on turning on and off of the switching elements, and includes a control information calculation unit 19a, a PWM control unit (control unit) 19b and a communication unit 19c. The signal processing unit 19 is connected to the inverter 13 and the main control unit 18 and receives an input of voltage information, current information, a driving request and so on that are output from the main control unit 18. The signal processing unit 19 stores the operating mode of its own device, and has contents of signal processing different depending on the operating mode of the power supply device 1. The detail of the contents of signal processing will be described later.

The control information calculation unit 19a is a functional part for calculating PWM control information for controlling voltage or current to be output to the load 2 by controlling the operation of the inverter 13. The PWM control information is information indicative of the pulse width, pulse waveform and the like of a PWM signal to be output to the inverter 13.

In the case where the operating mode is the single power supply mode, the control information calculation unit 19a calculates PWM control information for performing PWM control on the inverter 13 of its own device based on the voltage information and current information output from the main control unit 18, that is, the voltage and current detected by its own device.

In the case where the operating mode is the master power supply mode, the control information calculation unit 19a calculates PWM control information for performing PWM control on the inverters 13 of the first power supply device 1 and the second power supply device 1 based on the voltage information and current information of its own device output from the main control unit 18 and the current information concerning another power supply device 1. That is, the control information calculation unit 19a calculates PWM control information based on the voltage and current detected by its own device and the current detected by another power supply device 1 serving as a slave power supply. Note that the current information detected by another power supply device 1 can be received by the communication unit 19c.

In the case where the operating mode is the slave power supply mode, the control information calculation unit 19a does not calculate PWM control information.

The PWM control unit 19b is a functional part for generating a PWM signal having required pulse width and pulse waveform by using the PWM control information and outputting it to the inverter 13. The PWM control unit 19b alternately switches the switching elements of the full bridge circuit crosswise between ON and OFF states to thereby output AC from the inverter 13.

In the case where the operating mode is the single power supply mode or the master power supply mode, the PWM control unit 19b generates a PWM control signal by using the PWM control information calculated by the control information calculation unit 19a of its own device.

In the case where the operating mode is the slave power supply mode, the PWM control unit 19b generates a PWM control signal using the PWM control information calculated by another power supply device 1. The PWM control information calculated by another power supply device 1 can be received by the communication unit 19c. If its own device and another power supply device 1 have the same output capacitance, the PWM signal of its own device and the PWM signal of another power supply device 1 are substantially the same as a result. If they have different output capacitance, the PWM control unit 19b generates a PWM signal for which the difference between the output capacitance is corrected using the PWM control information calculated by another power supply device 1. In this case, the PWM signal of its own device and the PWM signal of another power supply device 1 are different from each other.

The communication unit 19c is a communication circuit for transmitting and receiving various types of information to and from another power supply device 1. The communication unit 19c transmits and receives information according to the host control interface (HCI) communication standard, for example.

In the case where the operating mode is the master power supply mode, the signal processing unit 19 transmits operating information indicative of the operating state of the inverter 13 of its own device and PWM control information calculated by the control information calculation unit 19a to another power supply device 1 operating in the slave power supply mode via the communication unit 19c. The power supply device 1 serving as a slave power supply receives the operating information and PWM control information transmitted from the power supply device 1 operating in the master power supply mode by the communication unit 19c.

In the case where the operating mode is the slave power supply mode, the signal processing unit 19 transmits to the power supply device 1 operating in the master power supply mode via the communication unit 19c current information indicative of the current being output to the load 2 from its own device, operating information indicative of the operating state of the inverter 13 of its own device and abnormality information indicative of the presence or absence of abnormality of its own device. The abnormality information is information indicative of for example, excessive current, abnormal stop, or the like. The power supply device 1 serving as a master power supply receives the current information, the operating information and the abnormality information transmitted from the power supply device 1 operating in the slave power supply mode by the communication unit 19c.

Figure 3:
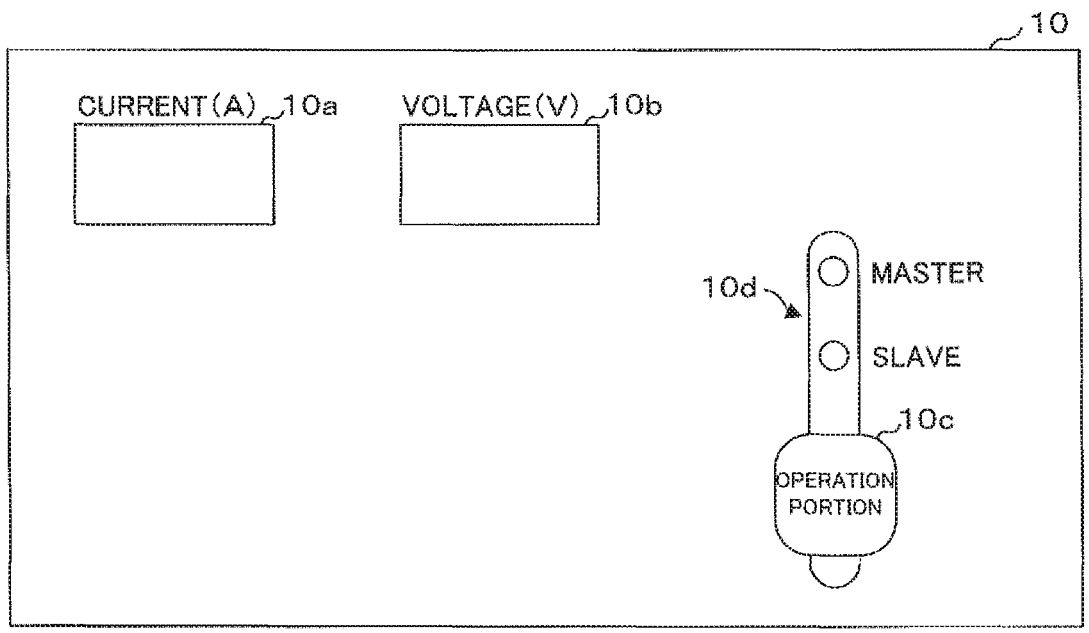
FIG. 3 is a schematic view illustrating one example of the configuration of an operation panel.

FIG. 3 is a schematic view illustrating one example of the configuration of the operation panel 10. The operation panel 10 includes a current display portion (display unit) 10a and a voltage display portion (display unit) 10b for displaying current and voltage that are being output to the load 2.

In the case where the operating mode is the master power supply mode, the main control unit 18 causes the current display portion 10a to display the value of the sum of the current obtained by summing up the current that is being output from each of the power supply devices 1. Furthermore, the main control unit 18 causes the voltage display portion 10b to display the value of the voltage obtained through the detection by its own device (see FIG. 6A). In the case where the operating mode is the slave power supply mode, the main control unit 18 causes the current display portion 10a and the voltage display portion 10b to display predetermined information indicating that its own device is being driven (see FIG. 6B). The predetermined information is character information such as "DRIVING," "RUN" or the like, but the contents of the information to be displayed is not limited to particular characters. It also includes a configuration in which display pixels or display segments constituting the current display portion 10a and the voltage display portion 10b are entirely illuminated or extinguished. In the case where the operating mode is the single power supply mode, the main control unit 18 causes the current display unit 10a and the voltage display unit 10b to display the values of current and voltage that are being output from its own device.

Furthermore, the operation panel 10 includes an operation portion 10c for switching the operating mode of the power supply device 1 and an operating mode display portion 10d for displaying the current operating mode of its own device. The operation portion 10c is, for example, a sealed tactile switch, a pushbutton switch, or the like. The main control unit 18 of the power supply device 1 switches the current operating mode to another operating mode when the operation portion 10c is operated. For example, the signal processing unit 19 stores the current operating mode, and the main control unit 18 switches the operating mode of the signal processing unit 19 by outputting a mode switching instruction to the signal processing unit 19. The operating mode is switched among the single power supply mode, the master power supply mode, the slave power supply mode and the single power supply mode . . . in this order, for example, every time that the operation portion 10c is operated.

The operating mode display portion 10d includes multiple light-emitting elements. The multiple light-emitting elements include a light-emitting element that lights up in the case of the master power supply mode and a light-emitting element that lights up in the case of the slave power supply mode, for example.

Figure 4:
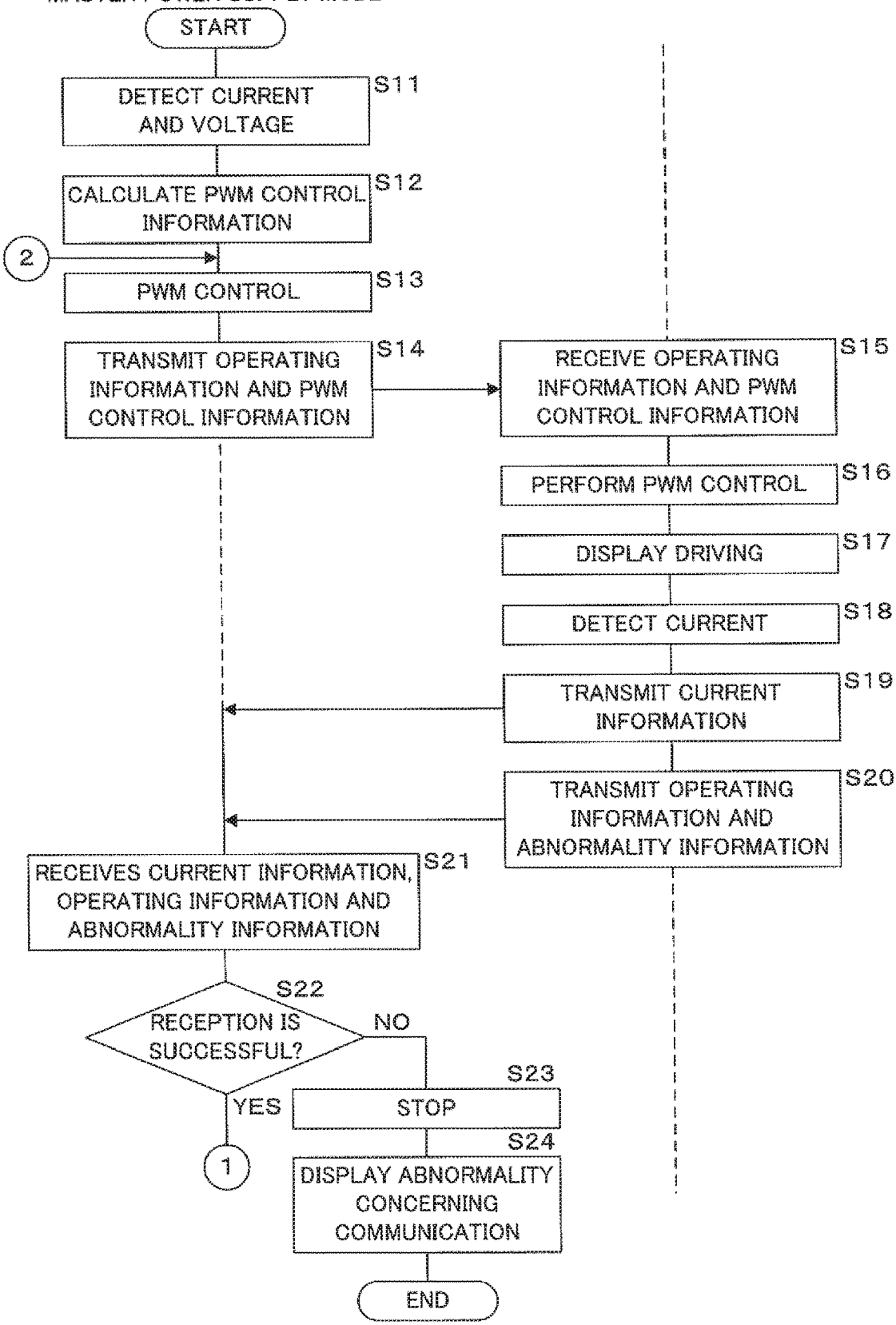
FIG. 4 is a flowchart illustrating the processing procedure of each of the power supply devices concerning power supply control.
Figure 5:
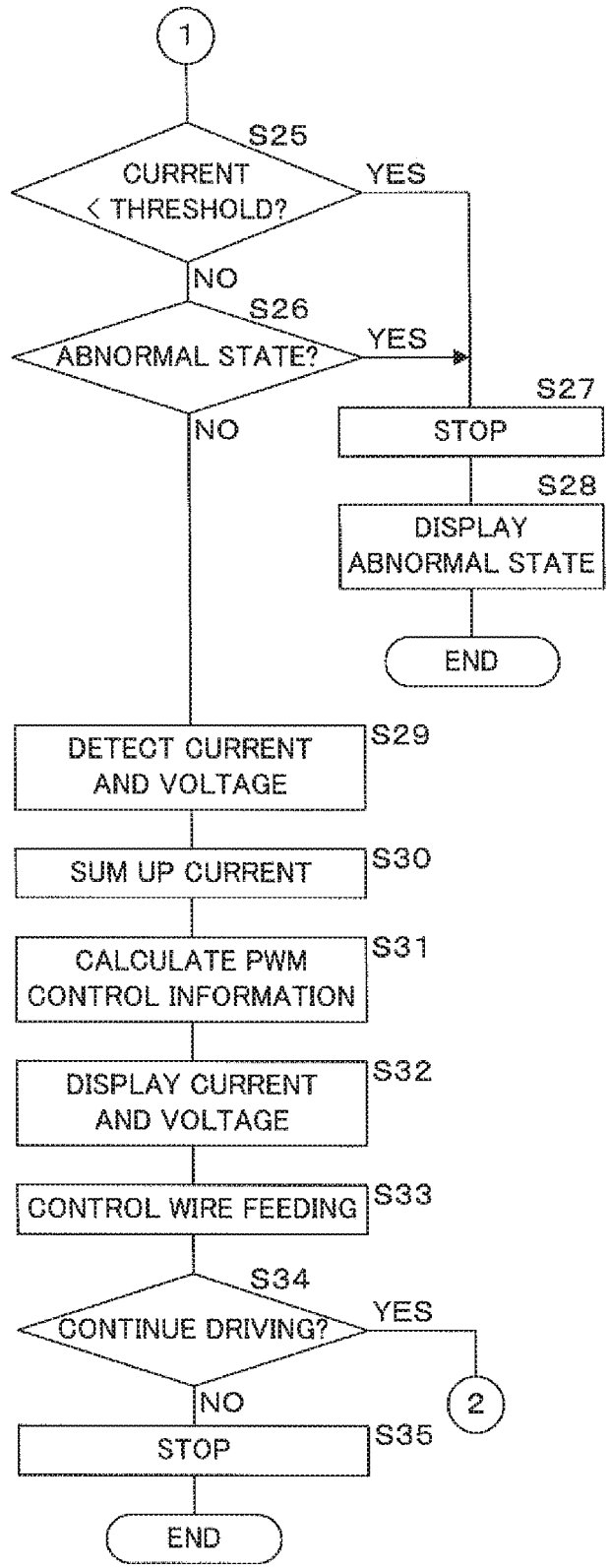
FIG. 5 is a flowchart illustrating the processing procedure of each of the power supply devices concerning power supply control.
Figure 6A:
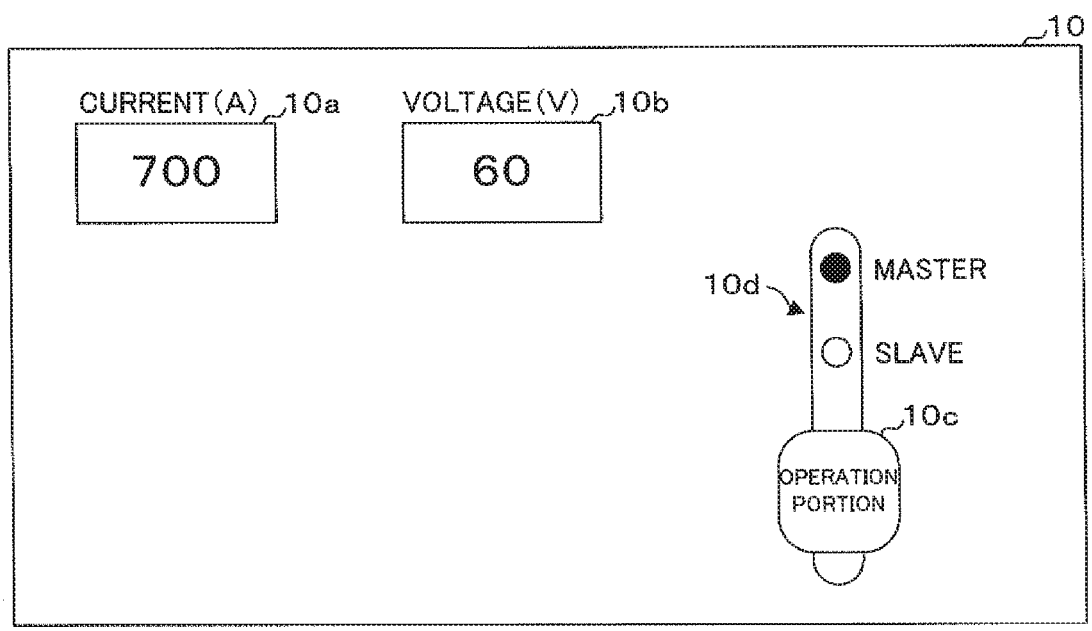
FIG. 6A is a schematic view illustrating a display example of an operating state.
Figure 6B:
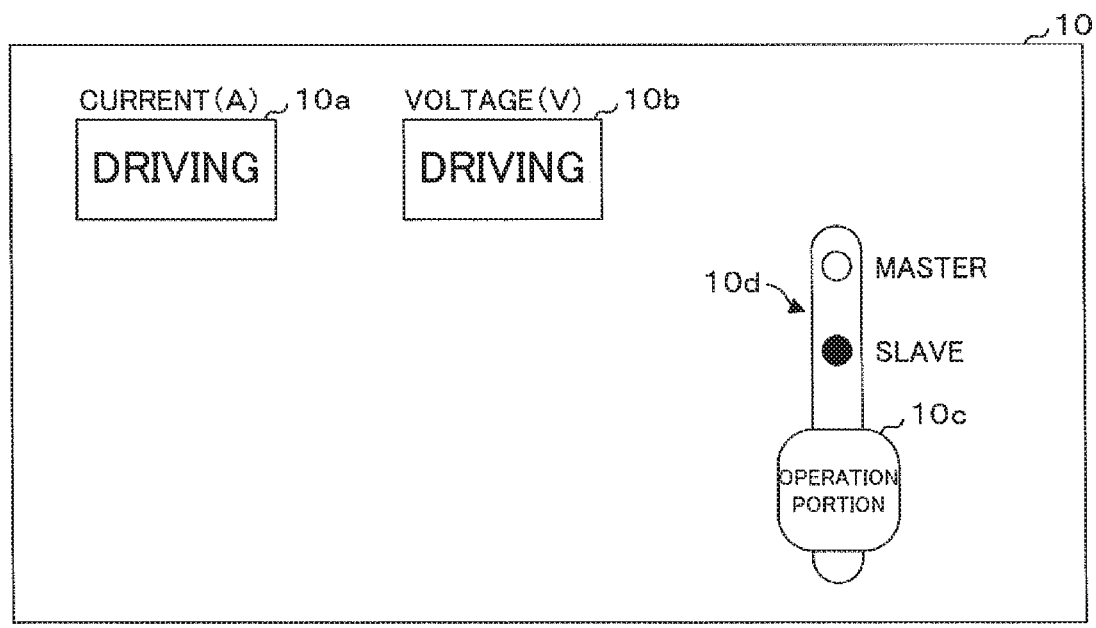
FIG. 6B is a schematic view illustrating a display example of an operating state.

FIG. 4 and FIG. 5 are flowcharts illustrating the processing procedure of the power supply devices 1 concerning power supply control. FIG. 6A and FIG. 6B are schematic views illustrating display examples of the operating states. The processing of the first power supply device 1 operating in the master power supply mode and the second power supply device 1 operating in the slave power supply mode will be described here. FIG. 6A depicts the operation panel 10 of the power supply device 1 in the master power supply mode while FIG. 6B depicts the operation panel 10 of the power supply device 1 in the slave power supply mode.

In the case where a driving instruction signal is input to the first power supply device 1 serving as a master power supply, the main control unit 18 detects the current and voltage that are being output from its own device to the load 2 by the current detection unit 17 and the voltage detection unit 16 (step S11). The main control unit 18 outputs the current information and voltage information obtained by detection to the signal processing unit 19.

The signal processing unit 19 in the master power supply mode calculates PWM control information based on the current and voltage indicated by the current information and the voltage information (step S12). Upon activation, the power supply device 1 serving as a slave has not yet started to operate and thus calculates PWM control information using the current and voltage detected by the first power supply device 1, for example.

The signal processing unit 19 then performs PWM control on the inverter 13 based on the calculated PWM control information (step S13). Subsequently, the signal processing unit 19 transmits operating information indicative of the operating state of the inverter 13 and the PWM control information to the second power supply device 1 serving as a slave power supply via the communication unit 19c (step S14). The operating information is information indicative of whether the inverter 13 is driving or not, for example.

The signal processing unit 19 in the slave power supply mode receives the operating information and PWM control information transmitted from the first power supply device 1 by the communication unit 19c (step S15). Next, the signal processing unit 19 in the slave power supply mode confirms that the master power supply is driving by the operating information and performs PWM control on the inverter 13 of its own based on the received PWM control information (step S16).

Note that the communication unit 19c that performs the transmission at step S14 corresponds to a control information transmission unit while the communication unit 19c that performs the reception at step S15 corresponds to a control information reception unit.

Subsequently, the main control unit 18 of the second power supply device 1 causes the operation panel 10 to display that the second power supply device 1 is being driven in the case where its own device is normally operating (step S17). As illustrated in FIG. 6B, for example, the main control unit 18 causes the current display portion 10a and the voltage display portion 10b to display that the second power supply device 1 is being driven.

Next, the main control unit 18 detects current that is being output from its own device to the load 2 by the current detection unit 17 (step S18). The main control unit 18 outputs the current information obtained by detection to the signal processing unit 19.

The signal processing unit 19 in the slave power supply mode transmits the current information detected by its own device to the first power supply device serving as a master power supply via the communication unit 19c (step S19). Furthermore, the signal processing unit 19 transmits operating information indicative of the operating state of the inverter 13 of its own device and abnormality information indicative of the presence or absence of abnormality to the first power supply device 1 via the communication unit 19*c* (step S20).

The signal processing unit 19 in the master power supply mode which has transmitted the PWM control information receives the current information, operating information and abnormality information transmitted from the second power supply device 1 (step S21) and determines whether or not the reception is successful (step S22).

The communication unit 19*c* that performs the transmission at step S19 corresponds to a current information transmission unit while the communication unit 19*c* that performs the transmission at step S20 corresponds to an abnormality information transmission unit. Furthermore, the communication unit 19*c* that performs the reception at step S21 corresponds to a current information reception unit and an abnormality information reception unit.

If it is determined that the reception is unsuccessful due to no response from the second power supply device 1 for a predetermined time or longer (step S22: NO), the signal processing unit 19 stops operation of the inverter 13 and calculating the PWM control information to thereby stop outputting to the load 2 (step S23). Note that when calculation of the PWM control information in the first power supply device 1 is stopped, the operation of the second power supply device 1 serving as a slave power supply is also stopped.

The signal processing unit 19 further notifies communication abnormality to the main control unit 18, causes the operation panel 10 to display the presence of abnormality concerning communication (step S24) and ends the processing.

It is noted that the communication abnormality occurs at a time of the disconnection of a communication line, faulty connection of a connector as well as occurs when the power supply device 1 to be operated as a slave power supply is erroneously operated in the master power supply mode.

If it is determined that the reception of the current information, the operating information and the abnormality information is successful by receiving a response from the second power supply device 1 (step S22: YES), the signal processing unit 19 determines whether or not the current indicated by the received current information is less than a predetermined threshold (step S25). It is noted that the signal processing unit 19 that performs the determination at step S25 corresponds to a determination unit.

If determining that the current is equal to or more than the threshold (step S25: NO), the signal processing unit 19 determines whether or not the state of the second power supply device 1 is abnormal based on the received abnormality information (step S26). For example, the signal processing unit 19 determines that abnormality occurs if the abnormality information indicates that the inverter 13 of the second power supply device 1 is in a stopped state or if the abnormality information indicates abnormality such as overcurrent or the like.

If it is determined that current is less than the threshold (step S25: YES), or if it is determined that abnormality occurs to the second power supply device 1 (step S26: YES), the signal processing unit 19 stops operation of the inverter 13 and calculating the PWM control information to thereby stop outputting to the load 2 (step S27). The signal processing unit 19 further notifies an abnormal state of the main control unit 18 while the main control unit 18 causes the operation panel 10 to display the occurrence of abnormality to the slave power supply (step S28) and ends the processing.

If it is determined the second power supply device 1 normally operates (step S26: NO), the main control unit 18 detects the current and voltage that are being output from its own device to the load 2 by the current detection unit 17 and the voltage detection unit 16, respectively (step S29). The main control unit 18 then sums up the current obtained through detection by its own device and the current indicated by the current information received from the second power supply device 1 (step S30). The signal processing unit 19 then calculates PWM control information based on the current obtained by the summation at step S30 and the voltage detected by its own device (step S31). The PWM control information calculated here is based on the current and voltage output from the overall power supply system to the load 2 and is information capable of controlling the output from the overall power supply system.

Subsequently, the main control unit 18 causes the current display portion 10*a* to display the value of the current calculated at step S30 and causes the voltage display portion 10*b* to display the value of the voltage detected at step S29 as illustrated in FIG. 6A (step S32).

Meanwhile, the main control unit 18 transmits information for controlling the welding device, such as wire feeding control signal for controlling feeding of a welding wire 21, for example, from the control terminal 1*c* to the welding device (step S33). The wire feeding control signal is a signal for controlling the feeding velocity of the welding wire 21, the start and stop of feeding the wire and the like.

Next, the main control unit 18 determines whether or not the input of the driving instruction signal continues (step S34). If the main control unit 18 determines that no driving instruction signal is input (step S34: NO), it stops outputting to the load 2 by stopping the control on the inverter 13 by the signal processing unit 19 (step S35) and ends the processing. If the main control unit 18 determines that a driving instruction signal is input (step S34: YES), it returns the processing to the step S13 and continues to perform control on the power supply to the load 2.

In the power supply system thus configured, the first power supply device 1 serving as a master power supply obtains current information from the second power supply device 1 serving as a slave power supply and calculates PWM control information for controlling the output from each of the power supply devices 1. The first power supply device 1 then transmits the calculated PWM control information to the second power supply device 1, and this power supply device 1 serving as a slave power supply controls the output based on the PWM control information calculated on the master power supply side. Accordingly, in the power supply system according to Embodiment 1, current output from each of the power supply devices 1 to the load 2 can be stably controlled.

Furthermore, the user can confirm the information about the current and voltage that are being output from the power supply system to the load 2 by using the current display portion 10 and the voltage display portion 10*b* of the first power supply device serving as a master power supply.

In addition, predetermined information is displayed on the current display portion 10*a* and the voltage display portion 10*b* of the second power supply device 1 operating as a slave power supply to thereby eliminate unnecessary confusion for the user.

Moreover, in the case where the first power supply device 1 serving as a master power supply cannot receive the current information that is to be transmitted from the slave power supply, it stops the entire power system to ensure safety, regarding that abnormality occurs to the communication with the second power supply device 1 serving as a slave power supply.

Furthermore, in the case where the current output from the second power supply device 1 serving as a slave power supply is less than a threshold though the first power supply device 1 serving as a master power supply outputs current from its own device, the first power supply device 1 stops the entire power supply system to ensure the safety, regarding that abnormality occurs to the second power supply device 1.

Additionally, if abnormality occurs to the operating state of the second power supply device 1 serving as a slave power supply, the first power supply device 1 serving as a master power supply stops the entire power supply system to ensure the safety.

In addition, by stopping the power supply system upon occurrence of such abnormalities, the power supply system can be protected.

Moreover, the power supply device 1 according to Embodiment 1 can function as both of the master power supply and the slave power supply by operating the operation portion 10c. Thus, even if the master power supply that constitutes the power supply system fails, the operating mode of the power supply device 1 functioning as a slave power supply is switched to the master power supply mode to thereby enable easy reconstruction of the power supply system.

Furthermore, the power supply device 1 according to Embodiment 1 can function as a single power supply as well by operating the operation portion 10c.

Note that an example of the two power supply devices 1 parallel-connected to the common load 2 is mainly described in Embodiment 1, but three or more power supply devices 1 may be used to form a power supply system.

Additionally, as an example of the load 2, a load concerning arc welding is described, but a power supply system for supplying power to a load concerning arc disconnection and other loads requiring large current may be employed as well.

In addition, the power supply system according to Embodiment 1 can output large current to an arc welding device.

Moreover, description is made on the case where an isolation transformer typed switching power supply is subject to PWM control in Embodiment 1, but the configuration and the control system of the power supply device 1 need not to be limited to particular ones, and well-known configuration and control system may be used. The well-known control system includes a pulse frequency modulation system as well as a pulse width modulation system, for example.

Furthermore, description is made on the case where the entire power supply system is stopped if abnormality occurs to the power supply device 1 operating as a slave power supply, but a configuration in which power supply to the load 2 may be continued if there is no problem as an entire power supply system may be possible. For example, assuming that multiple slave power supplies are parallel-connected and a disconnection relay or the like for disconnecting the power supply device for which abnormality is found from the power supply system is provided, in the case where required electric power can be supplied from the rest of the power supply devices 1, the multiple power supply devices 1 normally operating may continuously be operated.

Embodiment 2

The power supply system according to Embodiment 2 is different from Embodiment 1 in the transmission and reception timing of the PWM control information, current information and the like, and thus the above-mentioned difference will be mainly described below. Embodiment 2 is similar to Embodiment 1 in the configuration and working effect, and thus the detailed description will not be made by applying similar reference symbols to the corresponding parts.

Figure 7:
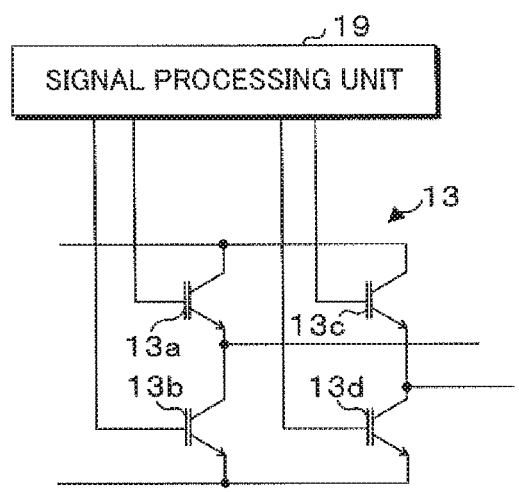
FIG. 7 is a circuit diagram illustrating one example of the configuration of an inverter.

FIG. 7 is a circuit diagram illustrating one example of the configuration of the inverter 13. The inverter 13 provided in the power supply device 1 has a circuit formed by two parallel-connected legs, one leg including a first switching element 13a and a second switching element 13b connected in series and the other leg including a third switching element 13c and a fourth switching element 13d connected in series. The first to fourth switching elements 13a, 13b, 13c and 13d are IGBTs, for example.

The gates of the first to fourth switching elements 13a, 13b, 13c and 13d are connected to the signal processing unit 19, and the signal processing unit 19 controls the operation of the inverter 13 by outputting a PWM signal (pulse signal) periodically switching between on and off to the gates of the first to fourth switching elements 13a, 13b, 13c and 13d.

Figure 8:
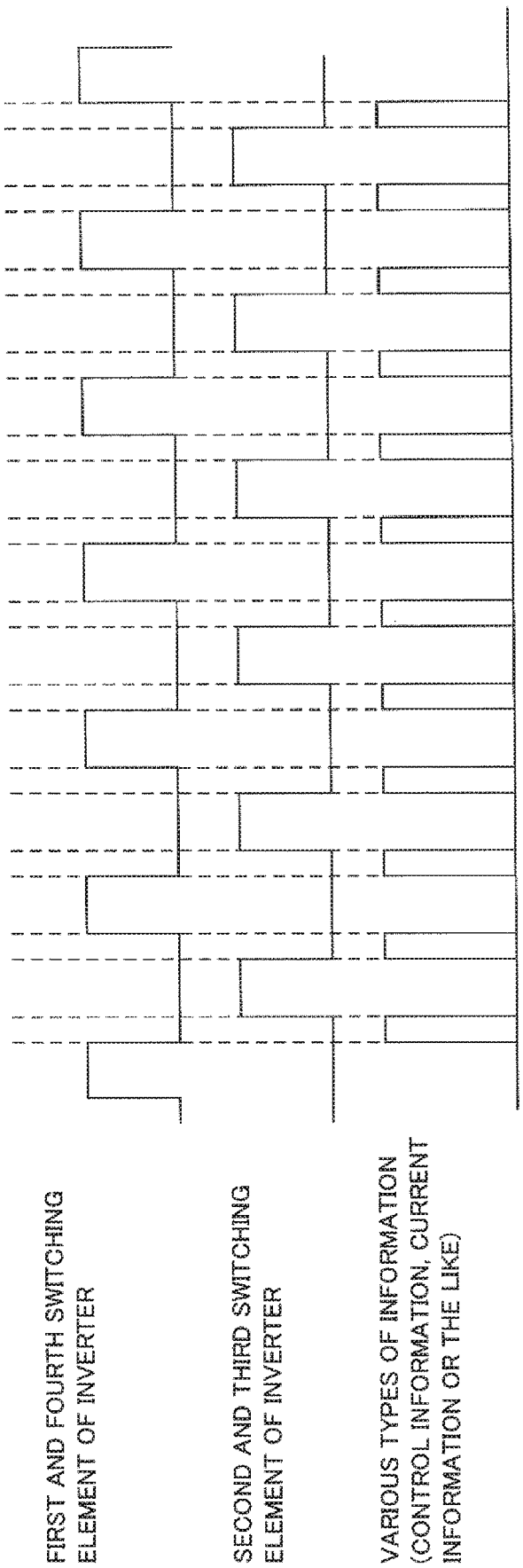
FIG. 8 is a timing chart illustrating the transmission timing of information.

FIG. 8 is a timing chart illustrating the transmission timing of information. The timing chart illustrated at the upper and the middle parts in FIG. 8 depicts output timing of PWM signals output from the signal processing unit 19 to the inverter 13. The signal processing unit 19 causes the inverter 13 to output alternating current by alternately outputting an on-signal with a required pulse width according to the PWM control information to the first and fourth switching elements 13a and 13d and the second and third switching elements 13b and 13c.

The timing chart illustrated at the bottom part in FIG. 8 depicts transmission timing of various types of information by the first power supply device 1 and the second power supply device 1. More specifically, the signal processing unit 19 of the first power supply device 1 in the master power supply mode specifies the time period during which the first to fourth switching elements 13a, 13b, 13c and 13d of the inverter 13 are entirely turned off in the processing at step S14 illustrated in FIG. 4, and transmits the operating information indicative of the operating state of the inverter 13 and the PWM control information to the second power supply device serving as a slave power supply via the communication unit 19c.

Similarly, the signal processing unit 19 of the second power supply device 1 in the slave power supply mode specifies the time period during which the first to fourth switching elements 13a, 13b, 13c and 13d of the inverter 13 are entirely turned off in the processing at step S19 illustrated in FIG. 4, and transmits the current information obtained by detection of its own device to the first power supply device 1 serving as a master power supply via the communication unit 19c. The signal processing unit 19 further specifies the time period during which the first to fourth switching elements 13a, 13b, 13c and 13d of the inverter 13 are entirely turned off in the processing at step S20 illustrated in FIG. 4, and transmits the operating information indicative of the operating state of the inverter 13 of its own device and the abnormality information indicative of the presence or absence of abnormality to the first power supply device 1 serving as a master power supply via the communication unit 19c.

According to the power supply system of Embodiment 2 thus configured, each of the power supply devices 1 is configured to transmit and receive PWM control information during the off time period of the PWM signal, which prevents noise caused by the operation of the inverter 13 from riding on the PWM control information. This makes it possible to improve communication stability among the power supply devices 1. Accordingly, it is possible to achieve both of the high-speed communication of the PWM control information and improvement in communication stability.

Similarly, each of the power supply devices 1 is configured to transmit and receive current information required for calculating the PWM control information and the other various types of information during the off time period of the PWM signal, which prevents noise caused by the operation of the inverter 13 from riding on the PWM control information and makes it possible to improve communication stability among the power supply devices 1.

Embodiment 3

The power supply system according to Embodiment 3 is different from Embodiments 1 and 2 in that the communication mode of each of the power supply devices 1 is switched depending on the operating state, and each of the power supply devices 1 outputs a feeding control signal of the welding wire 21, and thus the above-mentioned differences will be mainly described below. Embodiment 3 is similar to Embodiment 1 in the configuration and working effect, and thus the detailed description will not be made by applying similar reference symbols to the corresponding parts.

Figure 9:
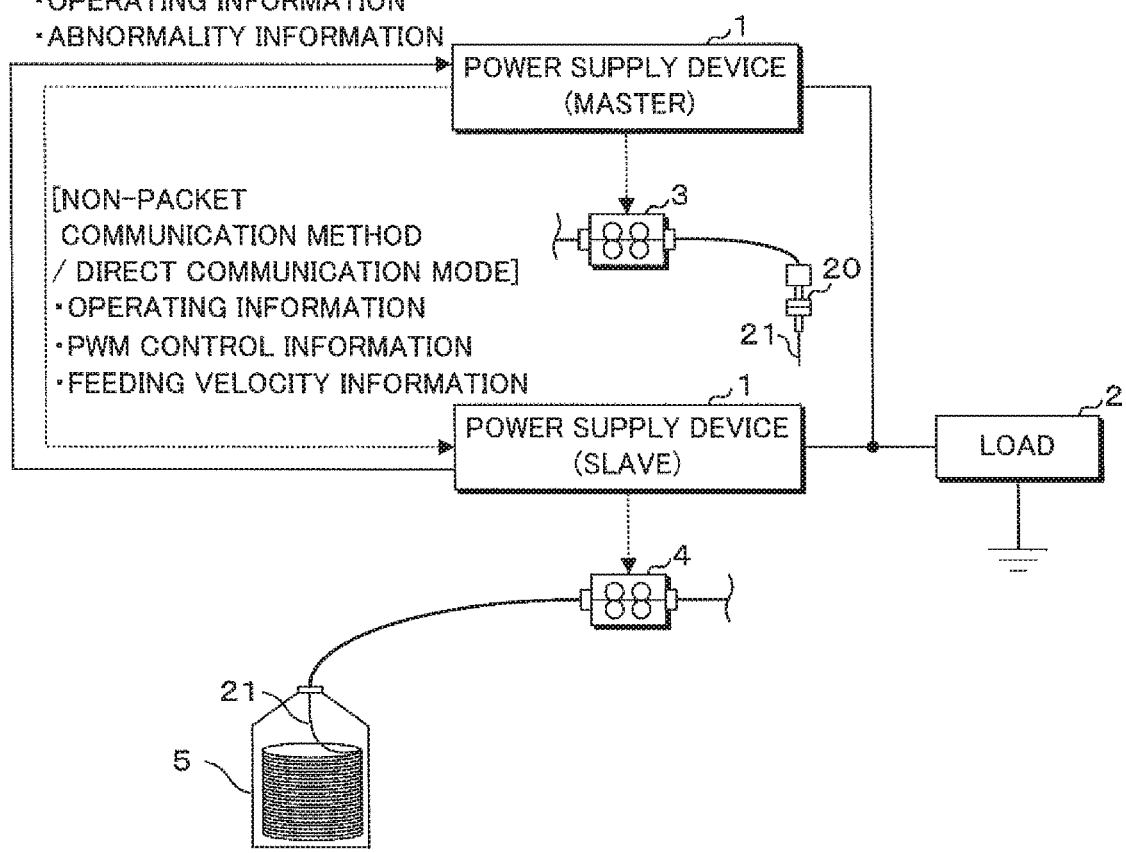
FIG. 9 is a block diagram conceptually illustrating a communication state during welding.
Figure 10:
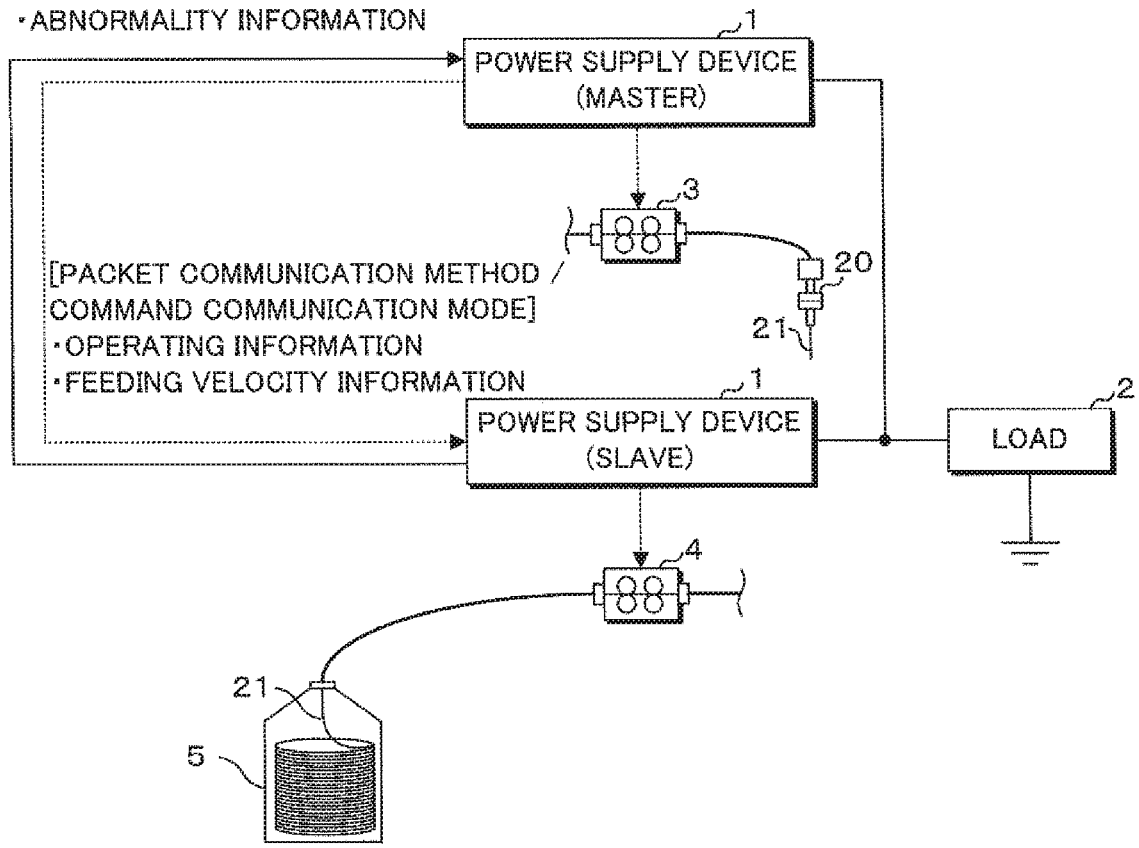
FIG. 10 is a block diagram conceptually illustrating a communication state during non-welding.

FIG. 9 is a block diagram conceptually illustrating a communication state during welding while FIG. 10 is a block diagram conceptually illustrating a communication state during non-welding. The welding device includes a first feeding unit 3 and a second feeding unit 4 that each withdraw the welding wire 21 from the wire feeding source 5 and feed it to the welding torch 20. The first power supply device 1 and the second power supply device 1 respectively output feeding control signals to the first feeding unit 3 and the second feeding unit 4. Note that similarly to current output, the first power supply device 1 of the multiple power supply devices 1 functions as a master device for controlling feeding of the welding wire 21 by the second power supply device 1 by transmitting velocity information indicative of the feeding velocity of the welding wire to another power supply device 1 through a communication line. The second power supply device 1 functions as a slave that receives the velocity information transmitted from the first power supply device 1 and controls feeding of the welding wire 21 based on the received velocity information.

The wire feeding source 5 stores the welding wire 20 so as to be able to deliver the welding wire 21 toward the welding torch 20. The welding wire 21 is a solid wire, for example, and function as a consumable electrode. The wire feeding source 5 is a pack wire stored in a pail pack in a spirally wound manner or a reel wire wound around a wire reel.

The first feeding unit 3 is disposed on the welding torch 20 side and has a pair of rollers that are opposite at a position where the welding wire 21 can be nipped therebetween. At least one of the rollers is rotatably driven by a motor. The first feeding unit 3 is connected to the first power supply device, and the power supply device 1 controls feeding of the welding wire 21 by the first feeding unit 3 by outputting a wire feeding control signal to the first feeding unit 3. The wire feeding control signal is a signal indicative of the feeding velocity of the welding wire 21, that is, the rotation speed of the rollers and controls the feeding velocity of the welding wire 21. Furthermore, during the welding operation, the first power supply device 1 transmits feeding velocity information indicative of the feeding velocity of the welding wire 21 together with the operating information and the PWM control information to the second power supply device 1.

During welding operation, as illustrated in FIG. 9, the feeding velocity information, the operating information and the PWM control information are transmitted to the second power supply device 1 as predetermined amount data, for example, 32 bit data by non-packet communication method. That is, the power supply device 1 transmits and receives information in a direct communication mode.

Meanwhile, during non-welding operation, for example, inching operation for delivering the welding wire 21, the first power supply device transmits feeding velocity information indicative of the feeding velocity of the welding wire 21 together with the operating information to the second power supply device 1 as illustrated in FIG. 10. During the non-welding operation, the feeding velocity information and the operating information are transmitted to the second power supply device 1 by packet communication method. That is, the power supply device 1 transmits and receives information in a command communication mode.

The second feeding unit 4 is disposed on the wire feeding source 5 side and has a pair of rollers that are opposite at a position where the welding wire 21 can be nipped therebetween. At least one of the rollers is rotatably driven by a motor. The second feeding unit 4 is connected to the second power supply device 1, and the power supply device 1 controls feeding of the welding wire 21 by the second feeding unit 4 by outputting a wire feeding control signal to the second feeding unit 4.

Especially, in the case of the welding operation, the second power supply device 1, as illustrated in FIG. 9, receives the feeding velocity information, operating information and PWM control information that are transmitted by non-packet communication method from the first power supply device 1 and controls the feeding of the welding wire 21 by the second feeding unit 4 by outputting a wire feeding control signal according to the received feeding velocity information to the second feeding unit 4.

Meanwhile, in the case of the non-welding operation, the second power supply device 1, as illustrated in FIG. 10, receives the feeding velocity information and operating information transmitted by packet communication method from the first power supply device 1 and controls the feeding of the welding wire 21 by the second feeding unit 4 by outputting the wire feeding control signal according to the received feeding velocity information to the second feeding unit 4.

Note that a buffer temporarily storing the welding wire 21 may be disposed between the first feeding unit and the second feeding unit as necessary.

Figure 11:
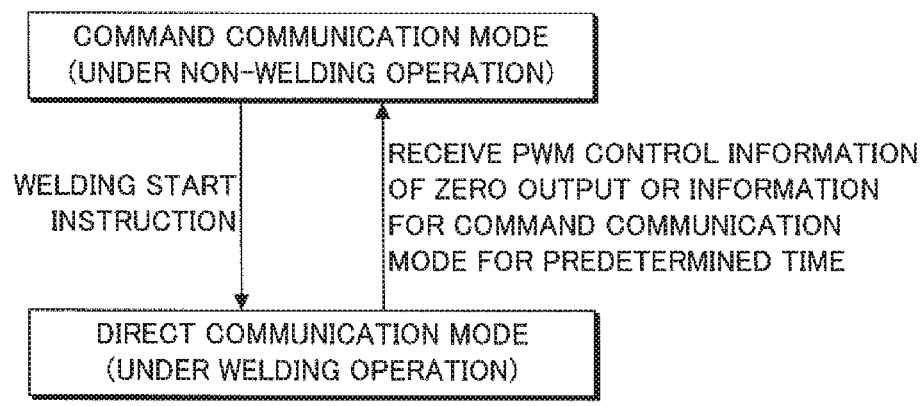
FIG. 11 is a transition diagram conceptually illustrating a method of switching a communication mode on a slave side.

FIG. 11 is a transition diagram conceptually illustrating a method of switching a communication mode on the slave side. The power supply device 1 serving as a master side switches the communication mode of information between the command communication mode and the direct communication mode depending on the presence or absence of an input of a driving instruction signal. More specifically, the first power supply device 1 selects the direct communication mode during the welding operation and selects the command communication mode during the non-welding operation. The second power supply device 1 is switched to the same communication mode as the first power supply device 1 depending on the state of communication with the first power supply device 1.

More specifically, during the non-welding operation during which no current concerning welding is output, the first power supply device 1 and the second power supply device 1 select the command communication mode to transmit and receive information. The first power supply device 1 and the second power supply device 1 control the velocity of the first feeding unit 3 and the second feeding unit 4 by transmitting and receiving the feeding velocity information to and from each other by packet communication method to thereby execute inching or the like of the welding wire 21.

If a driving instruction signal is input to the first power supply device 1 during the non-welding operation, the power supply device 1 transmits a welding start instruction or a communication mode switching request to the second power supply device 1 by packet communication method. If receiving the welding start instruction or the communication mode switching request, the second power supply device 1 transmits a response signal indicative of reception of the instruction to the first power supply device 1 and switches the communication mode to the command communication mode. If receiving the response signal from the second power supply device in response to the welding start instruction, the first power supply device 1 switches the communication mode to the command communication mode.

Hereafter, during the welding operation, the first power supply device 1 and the second power supply device 1 transmit and receive various types of information in the direct communication mode. More specifically, the operating information, the PWM control information, the feeding velocity information and the like are transmitted and received as 32 bit data.

If there is no input of a driving instruction signal, that is, if the welding operation is stopped, the first power supply device 1 transmits the PWM control information of zero output to the second power supply device 1 by non-packet communication method and switches the communication mode to the command communication mode. The PWM control information of zero output is information of a duty ratio of zero. The second power supply device 1 actively switches the communication method to the command communication mode if it receives the PWM control information of zero output or the information about the command communication mode for 20 milliseconds or longer, for example. Accordingly, at the end of welding, the communication mode of the first power supply device 1 and the second power supply device 1 can be surely switched to the command communication mode.

The power supply device according to Embodiment 3 thus configured can transmit and receive information by non-packet communication method, that is, in the direct communication mode during welding requiring high-speed communication and can transmit and receive various types of information by packet communication method, that is, in the command communication mode during non-welding operation not requiring high-speed communication.

Furthermore, at the start and end of the welding operation, the communication mode of the first power supply device 1 and the second power supply device 1 can surely be switched.

It is to be noted that, as used herein and in the appended claims, the singular forms "a", "an", and "the" include plural referents unless the context clearly dictates otherwise.

It is to be understood that the embodiments disclosed here is illustrative in all respects and not restrictive. The scope of the present invention is defined by the appended claims, and all changes that fall within the meanings and the bounds of the claims, or equivalence of such meanings and bounds are intended to be embraced by the claims.

The invention claimed is:

1. A power supply system comprising a plurality of power supply devices including a first power supply device and a second power supply device, the plurality of power supply devices being parallel-connected to a common load,
   wherein
   the first power supply device comprises
       a calculation unit that calculates control information for controlling voltage or current to be output to the load,
       a control unit that controls the voltage or current based on the control information calculated by the calculation unit, and
       a control information transmission unit that transmits the control information calculated by the calculation unit to the second power supply device,
   wherein
   the second power supply device comprises
       a control information reception unit that receives the control information transmitted from the first power supply device,
       a control unit that controls the voltage or current based on the control information received by the control information reception unit,
       a current detection unit that detects current output from the second power supply device to the load, and
       a current information transmission unit that transmits current information indicative of the current detected by the current detection unit to the first power supply device,
   wherein
   the first power supply device further comprises
       a current information reception unit that receives the current information transmitted from the second power supply device,
       a current detection unit that detects current output from the first power supply device to the load, and
       a voltage detection unit that detects voltage output from the first power supply device to the load,
       wherein
       the calculation unit calculates control information for controlling the voltage current based on the current indicated by the current information received by the current information reception unit, the current detected by the current detection unit and the voltage detected by the voltage detection unit that are included in the first power supply device;
   wherein the first power supply device and the second power supply device transmit and receive information to and from each other by packet communication method if they output no voltage or no current to the load, and transmit and receive information to and from each other by non-packet communication method for transmitting and receiving a predetermined amount of data if they output voltage or current to the load; and
   the second power supply device transmits and receives information by non-packet communication method and switches a communication method to a packet communication method if the second power supply device does not receive the control information for a predetermined time period or longer.

2. The power supply system according to claim 1, wherein each of the first power supply device and the second power supply device includes a display unit for indicating an operating state of each of the devices,
the display unit of the first power supply device displays, if the first power supply device is operating, current obtained by summing up the current detected by the first power supply device and the current indicated by the current information received by the current information reception unit and the voltage detected by the voltage detection unit, and
the display unit of the second power supply device displays, if the second power supply device is operating, predetermined information.

3. The power supply system according to claim 1, wherein the control unit of the first power supply device stops operation of the first power supply device if the current information reception unit receives no current information.

4. The power supply system according to claim 1, wherein the first power supply device further comprises a determination unit that determines whether or not the current indicated by the current information received by the current information reception unit is less than a threshold, and stops operation of the first power supply device if the determination unit determines that the current is less than the threshold.

5. The power supply system according to claim 1, wherein the second power supply device comprises an abnormality information transmission unit that transmits abnormality information indicative of presence or absence of abnormality for the second power supply device to the first power supply device, and
the first power supply device comprises
an abnormality information reception unit that receives the abnormality information transmitted from the second power supply device, wherein
the control unit of the first power supply device stops operation of the first power supply device depending on the abnormality information received by the abnormality information reception unit.

6. The power supply system according to claim 1, wherein the plurality of power supply devices supply power to a load concerning arc welding.

7. The power supply system according to claim 1, wherein
each of the power supply devices further comprises an inverter that is for controlling the voltage or current,
the control unit controls the voltage current by outputting a pulse signal to the inverter, and
the control information transmission unit transmits the control information during an off time period of the pulse signal output by the control unit.

8. The power supply system according to claim 7, wherein the current information transmission unit transmits current information during the off time period of the pulse signal output by the control unit.

9. A power supply device outputting voltage and current to a load, comprising:
a current detection unit that detects current output to the load;
a voltage detection unit that detects voltage output to the load;
a current information reception unit that receives current information indicative of current output from a different power supply device to the load;
a calculation unit that calculates control information for controlling voltage or current to be output to the load based on the current indicated by the current information received by the current information reception unit, the current detected by the current detection unit and the voltage detected by the voltage detection unit;
a control unit that controls the voltage or current based on the control information calculated by the calculation unit; and
a control information transmission unit that transmits the control information calculated by the calculation unit to the different power supply device;
wherein the power supply device and the different power supply device transmit and receive information to and from each other by packet communication method if they output no voltage or no current to the load, and transmit and receive information to and from each other by non-packet communication method for transmitting and receiving a predetermined amount of data if they output voltage or current to the load; and
the different power supply device transmits and receives information by non-packet communication method and switches a communication method to a packet communication method if the different power supply device does not receive the control information for a predetermined time period or longer.

10. The power supply device according to claim 9, further comprising:
a current information transmission unit that transmits current information indicative of the current detected by the current detection unit to the different power supply device;
a control information reception unit that receives control information transmitted from the different power supply device; and
an operation unit that selects between a first control mode based on the control information calculated by the calculation unit and a second control mode based on the control information received by the control information reception unit,
wherein the control unit controls the voltage or current based on the control information calculated by the calculation unit if the first control mode is selected, and controls the voltage or current based on the control information received by the control information reception unit if the second control mode is selected.

11. The power supply device according to claim 9, wherein
if no voltage or no current is output to the load, information is transmitted and received by packet communication method, while if voltage or current is output to the load, information is transmitted and received by non-packet communication method for transmitting and receiving a predetermined amount of data.

12. The power supply device according to claim 10, wherein
if no voltage or no current is output to the load, information is transmitted and received by packet communication method, while if voltage or current is output to the load, information is transmitted and received by non-packet communication method for transmitting and receiving a predetermined amount of data, and
if information is transmitted and received by non-packet communication method and the control information is not received for a predetermined time period or longer, a communication mode is switched to the packet communication method.

13. The power supply device according to claim 9 supplying power to a load concerning arc welding.

* * * * *